US006328779B1

(12) United States Patent
He et al.

(10) Patent No.: US 6,328,779 B1
(45) Date of Patent: Dec. 11, 2001

(54) MICROWAVE REGENERATED DIESEL PARTICULAR FILTER AND METHOD OF MAKING THE SAME

(75) Inventors: Lin He, Horseheads; Gregory A. Merkel, Big Flats; Cameron W. Tanner, Horseheads; Dale R. Wexell, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/583,500

(22) Filed: May 31, 2000

(51) Int. Cl.⁷ .................................................. B01D 39/20

(52) U.S. Cl. ........................ 55/523; 55/524; 55/DIG. 30; 60/311

(58) Field of Search ................................. 55/282.3, 523, 55/524, DIG. 10, DIG. 30; 60/311, 303; 423/213.2, 213.5

(56) References Cited

U.S. PATENT DOCUMENTS

| | | |
|---|---|---|
| 4,329,162 | 5/1982 | Pitcher, Jr. . |
| 4,477,771 * | 10/1984 | Nagy et al. ............................ 324/58.5 |
| 4,781,831 | 11/1988 | Goldsmith . |
| 5,009,781 | 4/1991 | Goldsmith . |
| 5,087,272 | 2/1992 | Nixdorf . |
| 5,108,601 | 4/1992 | Goldsmith . |
| 5,622,680 * | 4/1997 | Monceaux et al. ................ 423/213.5 |

FOREIGN PATENT DOCUMENTS

| | | |
|---|---|---|
| 0 420 513 | 1/1995 | (EP) . |
| 6-241022 | 8/1994 | (JP) . |

OTHER PUBLICATIONS

"Preparation of Bulk and Supported Perovskites", Twu and Gallagher, Chapter 1, pp 1–9, *Properties and Applications of Perovskite–Type Oxides*.

"Development of a Microwave Assisted Regeneration System for a Ceramic Diesel Particulate System" Gautam et al., *SAE Technical Paper Series* 1999–01–3565, pp. 1–16.

Application 60/157,895, P15201 Merkel, Oct. 5, 1999.

\* cited by examiner

*Primary Examiner*—Robert A. Hopkins
(74) *Attorney, Agent, or Firm*—Anca C. Gheorghiu

(57) ABSTRACT

A filter for trapping and combusting diesel exhaust particulates and method of making the same. The filter comprises a monolithic substrate coated with a refractory oxide material which at a frequency of 2.45 GHz heats up said filter from room temperature to about 600° C. in 5 minutes or less, and wherein said refractory oxide material has a loss tangent which decreases with increasing temperature such that an equilibrium in said filter temperature is reached at no greater than 1100° C. The microwave-absorbing material having a composition selected from the group consisting of $A_{1-x}M_xB_{1-y}M'_yO_{3-\alpha}$, where A and M are selected from the group consisting of Na, K, Rb, Ag, Ca, Sr, Ba, Pb, La, Pr, Nd, Bi, Ce, Th and combinations thereof; where B and M' are selected from the group consisting of Ti, V, Cr, Mn, Fe, Co, Ni, Rh, Ru, Pt, Zn, Nb, Ta, Mo, W and combinations thereof; wherein, the chemical formula is electrostatically balanced; $(A'_aR_rM''_m)(Z)_4(X)_6O_{24}$, where A' is from Group IA metals; where R is selected from Group IIA metals; where M" is selected from the group consisting of Mn, Co, Cu, Zn, Y, lanthanides and combinations thereof; where Z is selected from the group consisting of Zr, Hf, Ti, Nb, Ta, Y, lanthanides, Sn, Fe, Co, Al, Mn, Zn, Ni, and combinations thereof; where X is selected from the group consisting of P, Si, As, Ge, B, Al, and combinations thereof.

13 Claims, 1 Drawing Sheet

MICROWAVE REGENERATED DIESEL PARTICULAR FILTER AND METHOD OF MAKING THE SAME

CROSS-REFERENCE TO RELATED APPLICATIONS

An application entitled DIESEL EXHAUST FILTERS, filed under Ser. No. 09/584,932 in the names of L. He, G. Merkel, C. Tanner, and D. Wexell and assigned to the same assignee as this application, is directed to a filter for trapping and combusting diesel exhaust particulates comprising a microwave-absorbing filter body and a method of making the same.

BACKGROUND OF THE INVENTION

The present invention relates to microwave regenerated filters for use in exhaust streams for capturing particulate matter. In particular the present invention relates to microwave regenerated porous ceramic diesel exhaust filters having improved resistance to melting during regeneration.

Recently much interest has been directed towards the diesel engine due to its efficiency, durability and economical aspects. However, diesel emissions have come under attack both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

One of the biggest challenges in lowering diesel emissions is controlling the levels of diesel particulate material (DPM) present in the diesel exhaust stream. In 1998 DPM was declared a toxic air contaminant by the California Air Resources Board. As mentioned herein above legislation has been passed that regulates the concentration and particle size of DPM pollution originating from both mobile and stationary sources.

DPM which is mainly carbon particulates, is also known as soot. One way of removing diesel soot from the diesel exhaust is through diesel traps. The most widely used diesel trap is the diesel particulate filter (DPF) which is used to capture the soot. The DPF is designed to provide for nearly complete filtration of the soot without hindering the exhaust flow. However, as diesel soot accumulates, exhaust flow becomes increasingly difficult and the DPF must either be replaced or the accumulated diesel soot must be cleaned out. Cleaning the accumulated diesel soot from the DPF is achieved via burning-off or oxidation to $CO_2$ and is known in the art as regeneration. Regeneration is considered to be a superior approach over DPF replacement since no interruption for service is necessary.

The regeneration process can be either passive or active. In a passive system, regeneration occurs when the DPF becomes so filled with carbon particulates that heat accumulated in the exhaust system due to excessive back pressure raises the temperature of the carbon to a point where it ignites. This design can result in thermal shock or melt down of the filter, high fuel penalty and poor filtering action. Active regeneration is considered to be a superior approach over passive regeneration. In an active system, heat required to initiate combustion of the soot is generated by an outside source. Electrical power, fuel burners and microwave energy have all been studied as heat sources. Microwave energy is considered to be a superior approach over electrical power and fuel burners because it is highly efficient, cost effective and energy saving.

Microwave regeneration has been addressed, for example in U.S. Pat. No. 5,087,272 (Nixdorf) and Japanese Pat. Appl. Disclosure No. 6-241022 (Arakawa).

Nixdorf discloses a microwave regenerated filter made of single crystal silicon carbide whiskers which are consolidated into a preform of cylindrical configuration or into a thin layer such as a paper, which is folded into a tortuous structure.

Japanese Pat. Appl. Disclosure No. 6-241022 (Arakawa) discloses a filter having an electromagnetic absorbing coating which in combination with a regeneration gas acts to ignite the particles trapped by the filter. The coating materials disclosed are silicon carbide, aluminum nitride, titanium oxide and zinc oxide whiskers.

Two important problems exist with regeneration, and both are consequences of the carbon soot combustion which is highly exothermic. Rapid heating and cooling generates thermal stress that overtime could cause cracking of the DPF. Even worse, if too much carbon soot accumulates in the DPF, the regeneration process will evolve such a large quantity of heat that the DPF melts. To avoid these problems, the entire regeneration process should be performed as often as necessary to ensure that the amount of accumulated soot is insufficient to generate a large exotherm that could crack or melt the filter, thereby maintaining peak DPF performance.

Standard commercially available filters are made of cordierite ($2MgO-2Al_2O_3-5SiO_2$) which has a low coefficient of thermal expansion ($\sim 0.6-1.0 \times 10^{-6}/°$ C.) and is therefore suitable for applications involving rapid heating and cooling. However, cordierite has a relatively low melting point ($\sim 1458°$ C.). Hence, during the regeneration process cordierite filters are prone to localized melting as opposed to cracking since heat cannot be easily transferred through the entire body. Further, cordierite is transparent to microwaves.

A need therefore exists for a filter for trapping and combusting diesel exhaust particulates which can be regenerated by microwave energy, which is cost-effective and highly efficient and which has good strength and high thermal shock resistance to withstand the harsh chemical and physical conditions of typical diesel exhaust streams.

It is the purpose of the present invention to provide such a filter.

SUMMARY OF INVENTION

Accordingly there is provided a filter for trapping and combusting diesel exhaust particulates, and a method of making the same. The filter comprises a monolithic substrate having surfaces with pores which extend into the substrate, and, a coating extending over said substrate's surfaces as a substantially uninterrupted layer of a refractory oxide material which at a frequency of about 2.45 GHz heats up the filter from room temperature to about 600° C. in about 5 minutes or less, and where the refractory oxide material has a loss tangent which decreases with increasing temperature such that an equilibrium in the filter temperature is reached at no greater than about 1100° C.

In one embodiment the microwave-absorbing material has a composition represented by the general formula $A_{1-x}M_xB_{1-y}M'_yO_{3-\alpha}$, where A and M are selected from the group consisting of Na, K, Rb, Ag, Ca, Sr, Ba, Pb, La, Pr, Nd, Bi, Ce, Th and combinations thereof; where B and M' are selected from the group consisting of Ti, V, Cr, Mn, Fe, Co, Ni, Rh, Ru, Pt, Zn, Nb, Ta, Mo, W and combinations thereof; wherein, the chemical formula is electrostatically balanced.

In another embodiment the microwave-absorbing material has a composition represented by the general formula $(A'_a R_r M''_m)(Z)_4(X)_6 O_{24}$, where A' is selected from Group IA metals; where R is selected from Group IIA metals; where M" is selected from the group consisting of Mn, Co, Cu, Zn, Y, lanthanides and combinations thereof; where Z is selected from the group consisting of Zr, Hf, Ti, Nb, Ta, Y, lanthanides, Sn, Fe, Co, Al, Mn, Zn, Ni, and combinations thereof; where X is selected from the group consisting of P, Si, As, Ge, B, Al, and combinations thereof.

In one embodiment the monolith substrate is honeycomb-shaped in which the channels are plugged alternately at each end.

Filters according to the present invention can be produced by a process including the steps of providing a monolithic substrate and contacting the substrate with a coating a refractory oxide material which at a frequency of about 2.45 GHz heats up the filter from room temperature to about 600° C. in about 5 minutes or less, and where the refractory oxide material has a loss tangent which decreases with increasing temperature such that an equilibrium in the filter temperature is reached at no greater than about 1100° C. Next, the substrate is under conditions to effective to improve bonding between the substrate and the coating material.

DETAILED DESCRIPTION OF THE INVENTION

Figure 1:
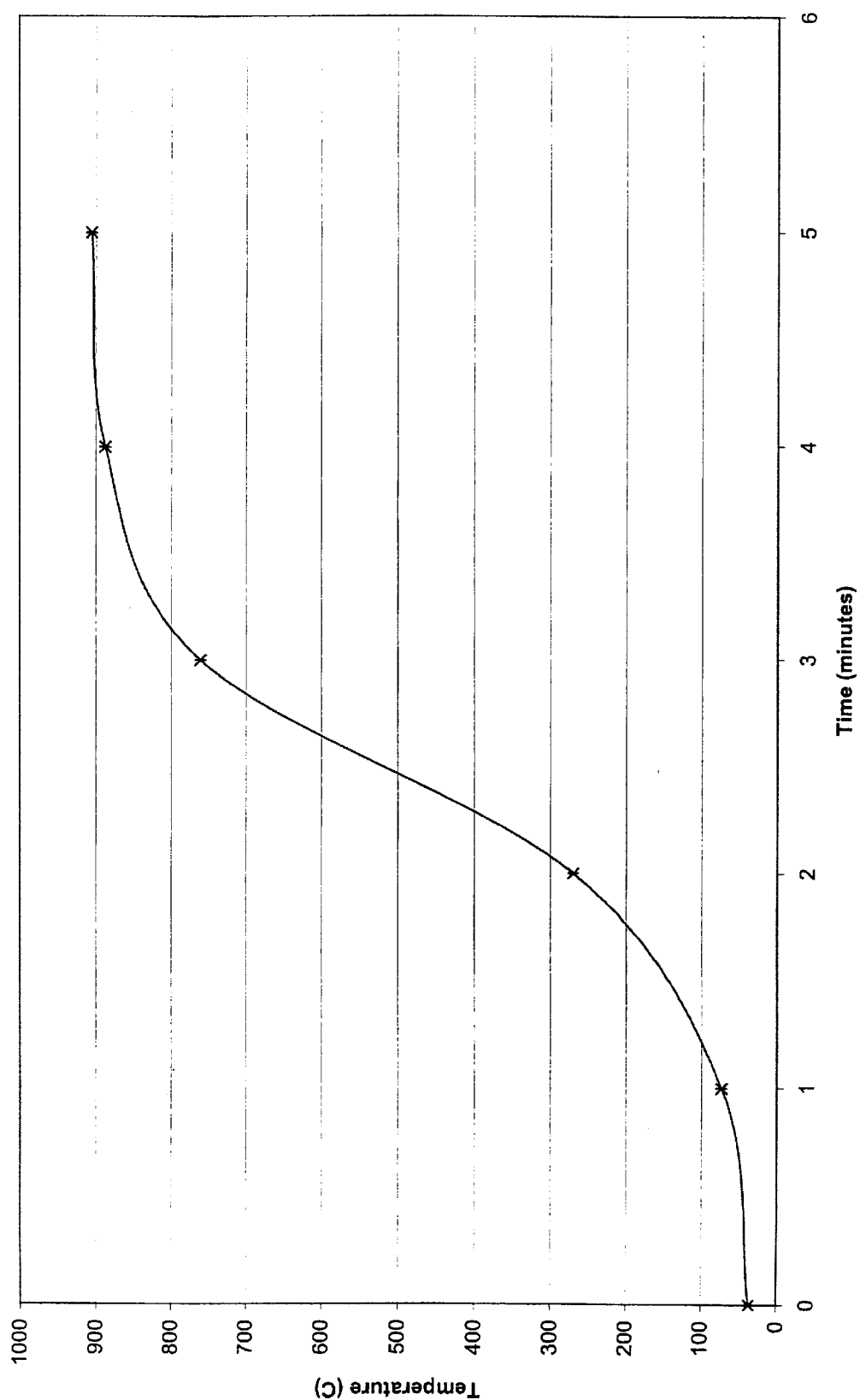
FIG. 1 shows the increase in temperature with time of a porous cordierite honeycomb filter coated with 50 weight percent of a porous coating of $LaMn_{0.8}Pt_{0.2}O_{3-\alpha}$ and subjected to microwaves with a frequency of 2.45 GHz at an energy of 700 W.

The present invention provides a filter for trapping and combusting diesel exhaust particulates which can be regenerated by microwave energy, which is cost-effective and highly efficient and which has good strength and high thermal shock resistance to withstand the harsh chemical and physical conditions of typical diesel exhaust streams. In particular the inventive diesel particulate filter includes a monolith substrate, and a coating of a microwave-absorbing material dispersed thereon, such that upon exposure to a microwave power source the trapped diesel exhaust particles are burned-off and the filter is regenerated.

The monolithic substrate can have any shape or geometry suitable for a particular application, however, it is preferred that the monolith substrate be a multicellular structure such as a honeycomb structure. Honeycombs are multicellular bodies having an inlet and outlet end or face, and a multiplicity of cells extending from the inlet end to the outlet end. The walls of the cells are porous. Generally honeycomb cell densities range from about 10 cells/in² (1.5 cells/cm²) to about 600 cells/in² (93 cells/cm²). The monolithic substrate has surfaces with pores which extend into the substrate.

In a preferred embodiment the honeycomb substrate is made of cordierite as disclosed in U.S. Pat. No. 4,329,162 herein incorporated by reference in its entirety.

In another preferred embodiment the honeycomb substrate is a made of a refractory NZP-type structure as disclosed in co-pending U.S. Provisional Application having Serial No. 60/157,985 filed on Oct. 5, 1999, assigned to the present assignee, and herein incorporated by reference in its entirety.

The honeycomb structure has an inlet end and outlet end and a multiplicity of cells extending from the inlet end to the outlet end. The cells have porous walls. A portion of the cells at the inlet end or face are plugged. The plugging is only at the ends of the cells which is typically to a depth of about 9.5 to 13 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. An exhaust stream flows into the substrate through the open cells at the inlet end, then through the porous cell walls, and out of the structure through the open cells at the outlet end. Filters of the type herein described are known as a "wall flow" filters since the flow paths resulting from alternate channel plugging require the fluid being treated to flow through the porous ceramic cell walls prior to exiting the filter.

Other suitable monolith substrates are cross flow structures such as those disclosed in U.S. Pat. Nos. 4,781,831, 5,009,781 and 5,108,601 which are herein incorporated by reference.

The coating is of a material which absorbs microwave energy and is highly efficient at converting the absorbed microwaves into thermal energy. Materials which are microwave absorbers are well known in the art (e.g., EP 420 513 B1). A material's ability to absorb microwaves is dictated by its dielectric constant; materials with large dielectric constants are good absorbers of microwave energy. It has been found, however, that not all materials which are good absorbers of microwave energy are suitable as coating materials for the present invention.

A more important material property in the coating materials of the present invention is the loss tangent, tan δ. The loss tangent is defined as the ratio of the dielectric loss factor to the dielectric permittivity and indicates a material's ability to convert microwave energy into thermal energy; the larger the loss tangent the greater the ability of a material to convert all of the absorbed microwave energy into thermal energy.

It has been found in the present invention, that suitable coating materials are those that have a loss tangent which is inversely proportional with temperature. More specifically, as microwaves are absorbed and converted into thermal energy the temperature of the filter increases. As the temperature of the filter increases the loss tangent of the coating material gradually decreases, and as such even though the same amount of microwaves may be absorbed, less are converted into thermal energy. Therefore, the temperature of the filter reaches an equilibrium, preferably at about 1100° C. upon continued exposure to a source of microwaves.

It has been found that not all materials which are good absorbers of microwave energy are suitable as coating materials for the present invention. In fact suitable materials are only those that meet the following criteria: 1) heat up at a frequency of about 2.45 GHz from room temperature (RT) to about 600° C. in about 5 minutes or less, and 2) have a loss tangent which decreases with increasing temperature such that an equilibrium in the temperature of the filter is reached at about 1100° C., and more preferably at about 900° C.–1000° C. These conditions are particularly beneficial especially for standard commercially available cordierite honeycomb substrates which have a melting point at about 1458° C., and which when coated with the inventive materials are less susceptible to localized melting and thermal shock during the regeneration process.

Furthermore, the coating material must be chemically compatible with the monolith substrate over the entire operating range of the diesel particulate filter. More specifically the coating material and the monolith substrate must not react or interdiffuse significantly during operation where the temperature at the interface of the substrate with the coating could reach up to about 1000° C.

Still further, the coating material must be stable with respect to the exhaust gas which is oxidizing and stable in a reducing atmosphere during regeneration. The coating experiences a wide range of oxygen partial pressures, perhaps as broad as $10^{22}$ atmospheres. Overall, diesel exhaust is oxidizing and contains 6–12% $O_2$, and the coating materials must survive net oxidizing conditions at a minimum.

Still further, the coating must be porous and possess adequate permeability to allow gas flow through the coating and underlying monolith substrate base.

In one embodiment a suitable material for the coating of the present invention has a Perovskite-type structure which is non-stoichiometric in oxygen. The composition of this material is represented by the general formula $A_{1-x}M_xB_{1-y}M'_yO_{3-\alpha}$, where A and M are selected from the group of the elements Na (sodium), K (potassium), Rb (rubidium), Ag (silver), Ca (calcium), Sr (strontium), Ba (barium), Pb (lead), La (lanthanum), Pr (praseodymium), Nd (neodymium), Bi (bismuth), Ce (cerium), Th (thorium); where B and M' are from the group of the elements Ti (titanium), V (vanadium), Cr (chromium), Mn (manganese), Fe (iron), Co (cobalt), Ni (nickel), Rh (rhodium), Ru (ruthenium), Pt (platinum), Nb (niobium), Ta (thalium), Mo (molybdenum), Zn (zinc) and W (tungsten); and, where the chemical formula is electrostatically balanced, i.e., the charges of the elements add up to a value of zero. These ceramics are non-stoichiometric in oxygen because in the formula the number of oxygen ions is not always equal to three. More specifically the value of 3–α can vary from 2.9 to 3.1.

An especially suited formula is $A_{1-x}M_xB_{1-y}M'_yO_{3-\alpha}$; where A and M are selected from the group of elements La, Bi, Sr, and combinations thereof; where B and M' are selected from the group of elements $Mn^{3+}$, $Mn^{4+}$, Pt, Zn, Co, Ru, Fe, Cu, $Ti^{3+}$, $Ti^{4+}$ and combinations thereof; and, where the chemical formula is electrostatically balanced, i.e., the charges of the elements add up to a value of zero. A most preferred formula is $LaMn_{1-y}M'_yO_{3-\alpha}$ where M' is one or more of the metals Pt, Ru, Fe, Zn, Cu, and combinations thereof and where $0 \leq y \leq 0.2$. For example a specific composition within this most preferred formula is $LaMn_{0.8}Pt_{0.2}O_{3-\alpha}$. Although not intended to be bound by theory, it is believed that these materials are heatable in a microwave energy field due to electronic conduction.

Another most preferred formula is $La_{1-x}Sr_xM'O_{3-\alpha}$ where M' is one or more of the metals Mn, Co, and combinations thereof, and where $0 \leq x \leq 0.2$. For example a specific composition within this most preferred formula is $La_{0.8}Sr_{0.2}MnO_{3-\alpha}$. Another example is $La_{0.8}Sr_{0.2}CoO_{3-\alpha}$. Although not intended to be bound by theory, it is believed that these materials are heatable in a microwave energy field due to electronic conduction.

The Perovskite-forming raw materials are metal oxide sources that react to form the Perovskite phase. Metal salts like nitrates, sulfates, acetates, oxides, carbonates, and chlorides are preferred. In the formulas above, for example a source for La is $La(NO_3)_3$; a source of Mn is $Mn(NO_3)_2$; a source of Pt is $(NH_3)_4Pt(NO_3)_2$; a source of Ru is $Ru(NO_3)_3$; a source of Fe is $Fe_2O_3$; a source of Cu is $Cu(NO_3)_2$; a source of Sr is $SrCO_3$; a source of Co is $Co_2O_3$; a source of Li is $Li_2CO_3$; a source of Na is $Na_2CO_3$; a source of Zr is $ZrO_2$; and a source of Nb is $Nb_2O_5$.

In another embodiment a suitable material for the coating of the present invention has an NZP-type structure. As used herein an "NZP-type structure" refers to a solid phase in which the arrangement of atoms is generally similar to that of the type compound $NaZr_2P_3O_{12}$, but in which some or all of the sodium, zirconium, or phosphorous is replaced by other substituent atoms. Also, additional atoms may be substituted into the crystal lattice sites that are vacant in $NaZr_2P_3O_{12}$, but which are fully occupied in the $Na_4Zr_2Si_3O_{12}$ structure which is also an NZP-type structure.

This series of ceramic compositions is represented by the general formula $(A'_aR_rM''_m)(Z)_4(X)_6O_{24}$, where A' represents one or more Group IA metals; where R represents one or more Group IIA metals; where M'' is selected from the group consisting of Mn (manganese), Co (cobalt), Cu (copper), Zn (zinc), Y (yttrium) and the lanthanide metals and combinations thereof; where Z is selected from the group consisting of Zr (zirconium), Hf (hafnium), Ti (titanium), Nb (niobium), Ta (thalium), Y, lanthanides, Sn (tin), Fe (iron), Co, Al (aluminium), Mn, Zn, Ni (nickel), and combinations thereof; where X is selected from the group consisting of P (phosphorous), Si (silicon), As (arsenic), Ge (germanium), B (boron), Al (aluminum), and combinations thereof; and, where the chemical formula is electrostatically balanced, i.e., the charges of the elements add up to a value of zero.

An especially suited formula for the inventive coating where A' is Na, Z is Zr, and X is P or Si, is $Na_{1+w}Zr_2P_{3-w}Si_wO_{12}$. In an especially preferred embodiment the value of w is 1 to 2.75. When the value of w is 1.5 the chemical formula for the specific composition can be written as $Na_{2.5}Zr_2P_{1.5}Si_{1.5}O_{12}$, and the resulting ceramic has an ultra low coefficient of thermal expansion and good thermal shock resistance. When the value of w is 2 the chemical formula the specific composition can be written as $Na_3Zr_2PSi_2O_{12}$, and the resulting ceramic also has an ultra low coefficient of thermal expansion and good thermal shock resistance. Although not intended to be bound by theory, it is believed that these compositions are heatable in a microwave energy field due to the movement of the sodium cations within the channels of the NZP crystal structure.

For the NZP-type structure ceramics the raw materials are metal oxide sources that react to form the NZP phase. Sources of sodium include, for example, $Na_2CO_3$, $Na_2ZrO_3$, and a sodium phosphate or sodium phosphate hydrate compound; sources for Zr include, for example, $Na_2ZrO_3$, $ZrO_2$, $ZrSiO_4$, $ZrP_2O_7$, $Zr_2P_2O_9$, $Zr(HPO_4)_2\cdot xH_2O$, $Zr(OH)_4$, $ZrOCl_2\cdot xH_2O$, zirconyl nitrate, zirconyl carbonate, and zirconium acetate; sources for P include, for example, $H_3PO_4$, $NH_4H_2PO_4$, $(NH_4)_2HPO_4$, $(NH_4)_3PO_4$, $ZrP_2O_7$, $Zr_2P_2O_9$, $Zr(HPO_4)_2\cdot xH_2O$, and sources for Si include, for example, colloidal silica, fused silica, zeolites, quartz, cristobalite, tridymite, $ZrSiO_4$, silicone oils or resins, and other silicon organometallic compounds such as tetraethylorthosilicate.

The coating is formed by contacting the monolith substrate with the above materials. A preferred contact method is by washcoating a slurry of discrete particles of the coating material onto the substrate. Other suitable methods include sol-gel coating, spray coating, and plasma coating.

Washcoating techniques involve forming a washcoating slurry of the coating material particles with various binder, e.g., alumina, zirconia, or silica, and then contacting the slurry with the monolith substrate. The washcoating slurry has a viscosity of about 50–2000 cp. The average particle size of the coating material in the slurry is about 0.5–40 micrometers, and more preferably about 0.5–5 micrometers. The contacting can be done any number of times to achieve the desired loading.

The resulting washcoated substrate is heat-treated to improve bonding between the substrate and the coating material. This is done by drying and calcining. The drying is done preferably under rotating conditions. The drying temperature is preferably about 25–200° C., and more preferably at about 50° C. for at least about 1 hour. Calcination is achieved at a temperature of 600–1100° C. with a hold at that temperature for up to 4 hours. The amount of washcoat on the substrate is about 20 to 60 wt. % based on the total weight of the substrate and coating.

As described herein above the inventive filters are regenerated upon exposure to a source of microwaves. It has been found that microwave energy at a frequency of 2.45 GHz at an energy of about 600 to 1100 watts, couples well with the compositions herein above described to convert the microwave energy into thermal energy and regenerate the filter. The structures are heated at a temperature sufficient to oxidize the carbon particulates, preferably in excess of 600° C. and less than 1100° C. These temperatures are reached in less than 5 minutes, and preferably in less than 3 minutes. Regeneration at these temperatures is carried out for a time sufficient to burn the carbon particulates. Due to the short heating times, the regeneration process in the inventive filters may be carried out as often as necessary to maintain peak filter performance.

The inventive filters have cellular densities between about 10 and 300 cells/in$^2$ (about 1.5 to 46.5 cells/cm$^2$), more typically about 100 to 200 cells/in$^2$ (about 15.5 to 31 cells/cm$^2$), which are considered useful to provide sufficient wall surface area in a compact structure. Wall thickness can vary upwards from the minimum dimension providing structural integrity, of about 0.002 in. (about 0.05 mm), but is generally less than about 0.06 in. (1.5 mm) to minimize the fraction of the filter volume occupied by the filter wall. A range between about 0.010 and 0.030 inches (about 0.25 mm and 0.76 mm) e.g., 0.017 inches, is most often selected as the preferred wall thickness.

Interconnected open porosity of the filter walls may vary, but is most generally greater than about 25% of the wall volume and usually greater than about 35% to allow fluid flow through the wall. Diesel filter integrity becomes questionable above about 70% open pore volume; volumes of about 50% are therefore typical. It is believed that the open porosity may be provided by pores in the channel walls having mean diameters in the range of about 1 to 60 microns, with a preferred range between about 10 and 50 microns. Volumetric porosity and mean pore size are typically specified as determined by conventional mercury-intrusion porosimetry.

The invention can be further illustrated, but not limited by the following examples.

EXAMPLE 1

A material having the composition $LaMn_{0.8}Pt_{0.2}O_{3-\alpha}$ was synthesized from $La(NO_3)_3$, $Mn(NO_3)_2$, and $(NH_3)_4Pt(NO_3)_2$ by the following process. The metal nitrates were dissolved in water to render an aqueous solution. Citric acid and ethylene glycol were added to obtain a chelated complex. The ratio of citric acid to metals was 1:1, i.e., two moles of citric acid with one mole of metals. The amount of ethylene glycol added was calculated as weight of ethylene glycol=1.5(weight of citric acid)(density of ethylene glycol).

The chelated complex was heated to 90° C. to form a gel. Then the temperature was increased to 120° C., and all of the water and $NO_x$ fumes were removed. The gel was puffed out to obtain a powder which was fired at 450° C. for 4 hours to dry the powder and remove any remaining elemental carbon. The powder was further sintered at 700° C. for about 3–5 hours to obtain a powder having the approximate composition $LaMn_{0.8}Pt_{0.2}O_{3-\alpha}$, as determined by powder x-ray diffractometry. The sintered powder was ball milled to have a desired particle size of about 30 micrometers.

About 90% by weight ball milled powder was mixed with about 10% by weight alumina Al-20 binder (manufactured by Alcoa, Pittsburgh, Pa.) to form a washcoating slurry. A cordierite honeycomb substrate having a cell geometry of approximately 100 cells/inch$^2$ with 0.017 inch thick cell walls was immersed into the slurry, withdrawn, and the excess slurry removed from the cells by blowing compressed air down the channels. The coated substrate was subsequently dried at 50° C. for 3 hours. This procedure was repeated until the substrate had picked up about 50 weight percent of the $LaMn_{0.8}Pt_{0.2}O_{3-\alpha}$ material.

The coated honeycomb was placed in a 2.45 GHz microwave chamber at a power of 700 W, and the temperature of the filter was measured as a function of time. The results are shown in FIG. 1.

In about 160 seconds, the filter reached a temperature of about 600° C., sufficient to commence the oxidation of the soot. After about 200 seconds, the temperature of the filter began to equilibrate at about 900° C.

EXAMPLE 2

A mixture of consisting of 26.7% by weight $Na_2CO_3$, 22.2% by weight $ZrP_2O_7$, 31.0% by weight $ZrO_2$, and 20.1% by weight $SiO_2$ powders was dry milled with zirconia milling media for several hours. The powder mixture was transferred to a large zirconia crucible, placed in an electrically heated furnace, heated at a rate of 50° C./hr to 1100° C., held for 5 hours at 1100° C., and cooled by shutting off power to the furnace. Powder x-ray diffractometry indicated that the mixture was substantially reacted to form an NZP phase of the approximate composition $Na_3Zr_2Si_2PO_{12}$.

The sintered material was crushed and passed through a 100 mesh screen. The coarse powder was subsequently ball milled in water to form a slurry. A honeycomb substrate having the composition $Ba_{1.25}Zr_4P_{5.5}Si_{0.5}O_{24}$ and a cell geometry of approximately 200 cells/inch$^2$ with 0.017 inch thick cell walls was immersed into the slurry, withdrawn, and the excess slurry removed from the cells by blowing compressed air down the channels. The coated substrate was subsequently dried at 50° C. for 3 hours. This procedure was repeated until the substrate had picked up 40 weight percent of the $Na_3Zr_2Si_2PO_{12}$ powder.

The coated honeycomb was placed in a 2.45 GHz (?) microwave chamber and a power of 660 W was applied for 90 seconds. In about 80 seconds the filter reached a temperature of about 600° C., sufficient to commence oxidation of the soot.

Although the present invention has been fully described by way of examples, it is to be noted that various changes and modifications will be apparent to those skilled in the art. Therefore, unless otherwise such changes and modifications depart from the scope of the present invention, they should be construed as included therein.

What is claimed is:

1. A filter for trapping and combusting diesel exhaust particulates, said filter comprising
   a monolithic substrate having surfaces with pores which extend into said substrate; and,
   a coating extending over said substrate's surfaces as a substantially uninterrupted layer of a refractory oxide material which at a frequency of about 2.45 GHz heats up said substrate from room temperature to about 600° C. in about 5 minutes or less, and wherein said refractory oxide material has a loss tangent which decreases with increasing temperature such that an equilibrium in said filter temperature is reached at no greater than about 1100° C., wherein said refractory oxide material has a composition represented by the formula $(A'_a R_r M''_m)(Z)_4(X)_6 O_{24}$, where A' is from Group IA metals; where R is selected from Group IIA metals; where M'' is selected from the group consisting of Mn, Co, Cu, Zn, Y, lanthanides and combinations thereof; where Z is selected from the group consisting of Zr, Hf, Ti, Nb, Ta, Y, lanthanides, Sn, Fe, Co, Al, Mn, Zn, Ni, and combinations thereof; where X is selected from the group consisting of P, Si, As, Ge, B, Al, and combinations thereof; wherein, said chemical formula is electrostatically balanced.

2. The filter of claim 1 wherein said monolithic substrate is a honeycomb substrate having an inlet and outlet end and a multiplicity of cells extending from said inlet end to said outlet end, said cells having porous walls, wherein part of the total number of cells at said inlet end are plugged along a portion of their lengths, and the remaining part of cells that are open at said inlet end are plugged at said outlet end along a portion of their lengths, so that a fluid stream passing through the cells of said honeycomb from said inlet end to said outlet end flows into said open cells, through said cell walls and out of said honeycomb substrate through said open cells at said outlet end.

3. The filter of claim 1 wherein said microwave-absorbing material coated on said monolith substrate is $LaMn_{0.8}Pt_{0.2}O_{3-\alpha}$.

4. The filter of claim 1 wherein said microwave absorbing material on said monolith substrate has a composition represented by the formula $Na_{1+x}Zr_2P_{3-w}Si_w O_{12}$ and the value of w is between 1.0 and 2.75.

5. The filter of claim 4 wherein said microwave-absorbing material coated on said monolith substrate is $Na_{2.5}Zr_2P_{1.5}Si_{1.5}O_{12}$.

6. The filter of claim 4 wherein said microwave-absorbing material coated on said monolith substrate is $Na_3Zr_2PSi_2O_{12}$.

7. A method of making a filter for trapping and combusting diesel exhaust particulates, said method comprising:
   (a) providing a monolithic substrate having surfaces with pores which extend into said substrate;
   (b) contacting said monolithic substrate with a microwave-absorbing material having a composition represented by the formula $(A'_a R_r M''_m)(Z)_4(X)_6 O_{24}$, where A' is from Group IA metals; where R is selected from Group IIA metals; where M'' is selected from the group consisting of Mn, Co, Cu, Zn, Y, lanthanides and combinations thereof; where Z is selected from the group consisting of Zr, Hf, Ti, Nb, Ta, Y, lanthanides, Sn, Fe, Co, Al, Mn, Zn, Ni, and combinations thereof; where X is selected from the group consisting of P, Si, As, Ge, B, Al, and combinations thereof; wherein, said chemical formula is electrostatically balanced;
   (c) drying said monolithic substrate coated with said microwave-absorbing material; and,
   (d) calcining said dried coated monolithic substrate.

8. The method of claim 7 wherein said monolithic substrate is a honeycomb substrate having an inlet and outlet end and a multiplicity of cells extending from said inlet end to said outlet end, said cells having porous walls, wherein part of the total number of cells at said inlet end are plugged along a portion of their lengths, and the remaining part of cells that are open at said inlet end are plugged at said outlet end along a portion of their lengths, so that a fluid stream passing through the cells of said honeycomb from said inlet end to said outlet end flows into said open cells, through said cell walls and out of said honeycomb substrate through said open cells at said outlet end.

9. A filter for trapping and combusting diesel exhaust particulates, said filter comprising:
   a monolithic substrate;
   a microwave-absorbing material coated on said monolith substrate, said microwave-absorbing material having a composition represented by the formula $LaMn_{1-y}M'_y O_{3-\alpha}$, where M' is selected from the group of metals consisting of Pt, Ru, Fe, Zn, Cu, and combinations thereof, and $0 \leq y \leq 0.2$.

10. The filter of claim 9 wherein said microwave-absorbing material coated on said monolith substrate is $LaMn_{0.8}Pt_{0.2}O_{3-\alpha}$.

11. The filter of claim 10 wherein said monolithic substrate is a honeycomb substrate having an inlet and outlet end and a multiplicity of cells extending from said inlet end to said outlet end, said cells having porous walls, wherein part of the total number of cells at said inlet end are plugged along a portion of their lengths, and the remaining part of cells that are open at said inlet end are plugged at said outlet end along a portion of their lengths, so that a fluid stream passing through the cells of said honeycomb from said inlet end to said outlet end flows into said open cells, through said cell walls and out of said honeycomb substrate through said open cells at said outlet end.

12. A method of making a filter for trapping and combusting diesel exhaust particulates, said method comprising:
   (a) providing a monolithic substrate having surfaces with pores which extend into said substrate;
   (b) contacting said monolithic substrate with a microwave-absorbing material having a composition represented by the formula $LaMn_{1-y}M'_y O_{3-\alpha}$, where M' is selected from the group of metals consisting of Pt, Ru, Fe, Zn, Cu, and combinations thereof, and $0 \leq y \leq 0.2$;
   (c) drying said monolithic substrate coated with said microwave-absorbing material, and,
   (d) calcining said dried coated monolithic substrate.

13. The method of claim 12 wherein said monolithic substrate is a honeycomb substrate having an inlet and outlet end and a multiplicity of cells extending from said inlet end to said outlet end, said cells having porous walls, wherein part of the total number of cells at said inlet end are plugged along a portion of their lengths, and the remaining part of cells that are open at said inlet end are plugged at said outlet end along a portion of their lengths, so that a fluid stream passing through the cells of said honeycomb from said inlet end to said outlet end flows into said open cells, through said cell walls and out of said honeycomb substrate through said open cells at said outlet end.

* * * * *

UNITED STATES PATENT AND TRADEMARK OFFICE
CERTIFICATE OF CORRECTION

PATENT NO. : 6,328,779 B1
DATED : December 11, 2001
INVENTOR(S) : He et al.

Page 1 of 1

It is certified that error appears in the above-identified patent and that said Letters Patent is hereby corrected as shown below:

<u>Column 9,</u>
Line 43, "$Na_{1+}Zr_2P_{3-w}Si_wO_{12}$" should be -- $Na_{1+w}Zr_2P_{3-w}Si_wO_{12}$ --

Signed and Sealed this

Twenty-eighth Day of May, 2002

Attest:

JAMES E. ROGAN
Attesting Officer
Director of the United States Patent and Trademark Office